(12) United States Patent
Lee

(10) Patent No.: US 11,124,974 B2
(45) Date of Patent: Sep. 21, 2021

(54) WOOD BLOCK MODULE CAPABLE OF LEVEL ADJUSTMENT AND SHOCK ABSORPTION

(71) Applicant: Kyeong Jun Lee, Incheon (KR)

(72) Inventor: Hyun Hee Lee, Incheon (KR)

(73) Assignee: Kyeong Jun Lee, Incheon (KR)

( * ) Notice: Subject to any disclaimer, the term of this patent is extended or adjusted under 35 U.S.C. 154(b) by 0 days.

(21) Appl. No.: 16/961,922

(22) PCT Filed: Dec. 19, 2018

(86) PCT No.: PCT/KR2018/016269
§ 371 (c)(1),
(2) Date: Jul. 13, 2020

(87) PCT Pub. No.: WO2019/160234
PCT Pub. Date: Aug. 22, 2019

(65) Prior Publication Data
US 2020/0340256 A1    Oct. 29, 2020

(30) Foreign Application Priority Data
Feb. 14, 2018  (KR) .................. 10-2018-0018734

(51) Int. Cl.
| | |
|---|---|
| *E04F 15/04* | (2006.01) |
| *E04B 1/02* | (2006.01) |
| *B32B 7/12* | (2006.01) |
| *E04F 15/02* | (2006.01) |
| *E04B 5/02* | (2006.01) |

(52) U.S. Cl.
CPC ........ *E04F 15/02194* (2013.01); *E04F 15/04* (2013.01); *B32B 7/12* (2013.01);
(Continued)

(58) Field of Classification Search
CPC ............... E04F 15/02194; E04F 15/04; E04F 2201/095; E04F 2015/02127;
(Continued)

(56) References Cited

U.S. PATENT DOCUMENTS

| 10,563,412 B1 * | 2/2020 | Paik ........................ B32B 3/06 |
| 2004/0139679 A1 * | 7/2004 | Della Pepa ........... E04F 15/203 52/578 |

(Continued)

FOREIGN PATENT DOCUMENTS

| KR | 20-0312058 Y1 | 5/2003 |
| KR | 20-0318291 Y1 | 6/2003 |

(Continued)

OTHER PUBLICATIONS

International Search Report for PCT/KR2018/016269 dated Mar. 28, 2019 from Korean Intellectual Property Office.

*Primary Examiner* — Phi D A
(74) *Attorney, Agent, or Firm* — Revolution IP, PLLC

(57) ABSTRACT

A wood block module includes: a wood block having a deck groove formed on both sides thereof longitudinally; and a deck base disposed below the wood block, on which the wood block is placed, wherein the deck base may include: a rectangular frame; a core positioned at the center of the frame; a connection bridge extending radially from the core and connecting the core and the frame; an extended part extending from the outer side of the frame in a direction orthogonal to the connection bridge; and a protruded part protruding from the end of the extended part in a direction parallel to the connection bridge and corresponding to the deck groove of the wood block.

4 Claims, 15 Drawing Sheets

(52) U.S. Cl.
CPC ............... *E04B 1/02* (2013.01); *E04B 5/023* (2013.01); *E04F 15/02044* (2013.01); *E04F 2201/095* (2013.01)

(58) Field of Classification Search
CPC .......... E04F 15/02044; E04F 15/02038; E04B 5/023; E04B 1/003; E04B 1/02; E04B 5/16; E01C 13/045; F16F 1/44; F16F 1/373; B32B 27/304; B32B 7/12; F03G 5/06; F03G 7/08
See application file for complete search history.

(56) References Cited

U.S. PATENT DOCUMENTS

| | | | |
|---|---|---|---|
| 2011/0023389 A1* | 2/2011 | Myers | F21V 33/006 |
| | | | 52/173.1 |
| 2016/0279914 A1* | 9/2016 | Rose | E04F 15/107 |
| 2017/0114552 A1* | 4/2017 | Randjelovic | E04F 15/22 |
| 2017/0234018 A1* | 8/2017 | Bovijn | A47G 27/0437 |
| | | | 52/506.05 |
| 2017/0274840 A1* | 9/2017 | Paik | B32B 15/14 |
| 2017/0321431 A1* | 11/2017 | Fang | B32B 21/06 |
| 2018/0347207 A1* | 12/2018 | Hayes | E04F 15/225 |
| 2020/0232227 A1* | 7/2020 | Mcintosh | E04F 15/087 |

FOREIGN PATENT DOCUMENTS

| | | |
|---|---|---|
| KR | 10-0467910 B1 | 1/2005 |
| KR | 10-2005-0102995 A | 10/2005 |
| KR | 10-0858843 B1 | 9/2008 |
| KR | 10-1279604 B1 | 6/2013 |
| KR | 10-1452380 B1 | 10/2014 |

\* cited by examiner (A)

(B)

WOOD BLOCK MODULE CAPABLE OF LEVEL ADJUSTMENT AND SHOCK ABSORPTION

TECHNICAL FIELD

The present invention relates to a wood block module and, more particularly, to a wood block module capable of level adjustment and shock absorption.

BACKGROUND ART

In a conventional wood block, a complex lower structure is fixed and used, which causes an increase in costs and a difficulty in height control. Furthermore, foreign substances stuck in the lower structure prevent proper drainage of water, leading to the distortion of the wood block. Also, because it is difficult to remove the foreign substances, odor occurs when the foreign substances are left for a long period of time.

In order to solve the problems described above, Korean Patent Registration No. 10-0858843, titled "ASSEMBLY STRUCTURE OF LOWER SUPPORT OF FLOOR MATERIAL", provides an assembly structure of a lower support of a floor material, wherein a lower support is fixed to the bottom, such as the cement bottom in a gymnasium, to form a floor, and a coupling hook of the lower support fixed to the bottom is inserted into a side surface coupling groove formed on the side surface of a floor material, thereby supporting the floor material. The lower support is fixed to the bottom first, and then the floor material is press-fit thereto and assembled, and thus, all of the four side surfaces of the assembled floor material are supported by the lower support fixed to the bottom, thereby firmly supporting the floor material without a separate adhesive. Also, partial disassembly and replacement of the floor assembly are possible, and when dismantled, only the floor material may be replaced while the lower support is left. Therefore, costs, generation of wastes, and noise may be significantly reduced. However, when a wood deck is installed outdoors, there are difficulties in performing construction for adjusting a space with respect to the bottom, and there are also limitations that the foreign substances are stuck in the bottom.

In addition, Korean Patent Registration No. 10-1452380, titled "ECO-FRIENDLY WOOD BLOCK AND MANUFACTURING METHOD THEREOF", provides a technical configuration in which a discharge hole is formed in the bottom surface of a wood frame so as to discharge rainwater and melt snow. However, there are also difficulties in adjusting a space with respect to the bottom and limitations that the foreign substances are stuck in the bottom.

Accordingly, in the technical field, the development of technology to conveniently manufacture a wood block module and significantly reduce construction costs and times by not installing a complex lower support or by simplifying the complex lower support has been required.

DISCLOSURE OF THE INVENTION

Technical Problem

The present invention is to solve the problems described above and provides a wood block module capable of independent construction and convenient assembly.

Also, the present invention is to provide a wood block module to achieve convenient maintenance, reduce construction costs such as installation costs, and minimize uncomfortable feeling of walking and noise generation.

Also, the present invention is to provide a wood block module in which shock and/or noise may be absorbed by installing a level adjusting pillar capable of level adjustment and/or a cushioning part.

Also, the present invention is to provide a wood block module in which the feeling of pedestrian walking is enhanced by installing a level adjusting pillar and/or a cushioning part.

The objectives of the present invention are not limited to the aforesaid, but other objectives not described herein will be clearly understood by those skilled in the art from descriptions below.

Technical Solution

In order to achieve the objectives above, a wood block module according to an embodiment of the present invention, includes: a wood block having a deck groove formed on each of both side surfaces in a longitudinal direction; and a deck base which is disposed below the wood block and on which the wood block is placed, wherein the deck base includes: a frame having a quadrangular frame shape; a core positioned at a center of the frame; a connection bridge which extends radially from the core and connects the core and the frame; an extended part which extends from an outer surface of the frame in a direction orthogonal to the connection bridge; and a protruded part which protrudes from an end of the extended part in a direction parallel to the connection bridge and corresponds to the deck groove of the wood block.

Also, a cross-section of the protruded part may have at least one of a circular, elliptical, diamond, rhombus, or quadrangle shape.

Also, an inner bridge radially disposed inside the core may be further included, and a height of the inner bridge may be less than a height of at least one of the connection bridge and the core.

Also, a level adjusting pillar disposed below the deck base may be further included, and an end of one side of the level adjusting pillar may be inserted into the core.

Also, the deck base may further include a positive connection bridge and a negative connection bridge which extend from the outer surface of the frame in the direction parallel to the connection bridge.

Also, the deck base may further include a seat part which crosses the at least one connection bridge to connect two facing sides of the frame, and a cushioning part, which is placed on the seat part and includes a rubber material, may be further included.

Advantageous Effects

The wood block module according to the embodiment of the present invention provides effects of providing the construction at a lower cost than in a conventional type, remarkably reducing a construction time, and achieving very convenient repair.

Also, the wood block module according to another embodiment of the present invention provides effects of providing comfortable feeling of walking by shock absorption and enhancing appearance of rough deck construction by pattern construction.

Also, the wood block module according to another embodiment of the present invention provides effects of enabling easy and convenient installation by installing the level adjusting pillar capable of level adjustment and/or the cushioning part, and enhancing the feeling of walking by attachment of the vibration-proof rubber so as to absorb noise that is likely to occur when walking.

MODE FOR CARRYING OUT THE INVENTION

Figure 1:
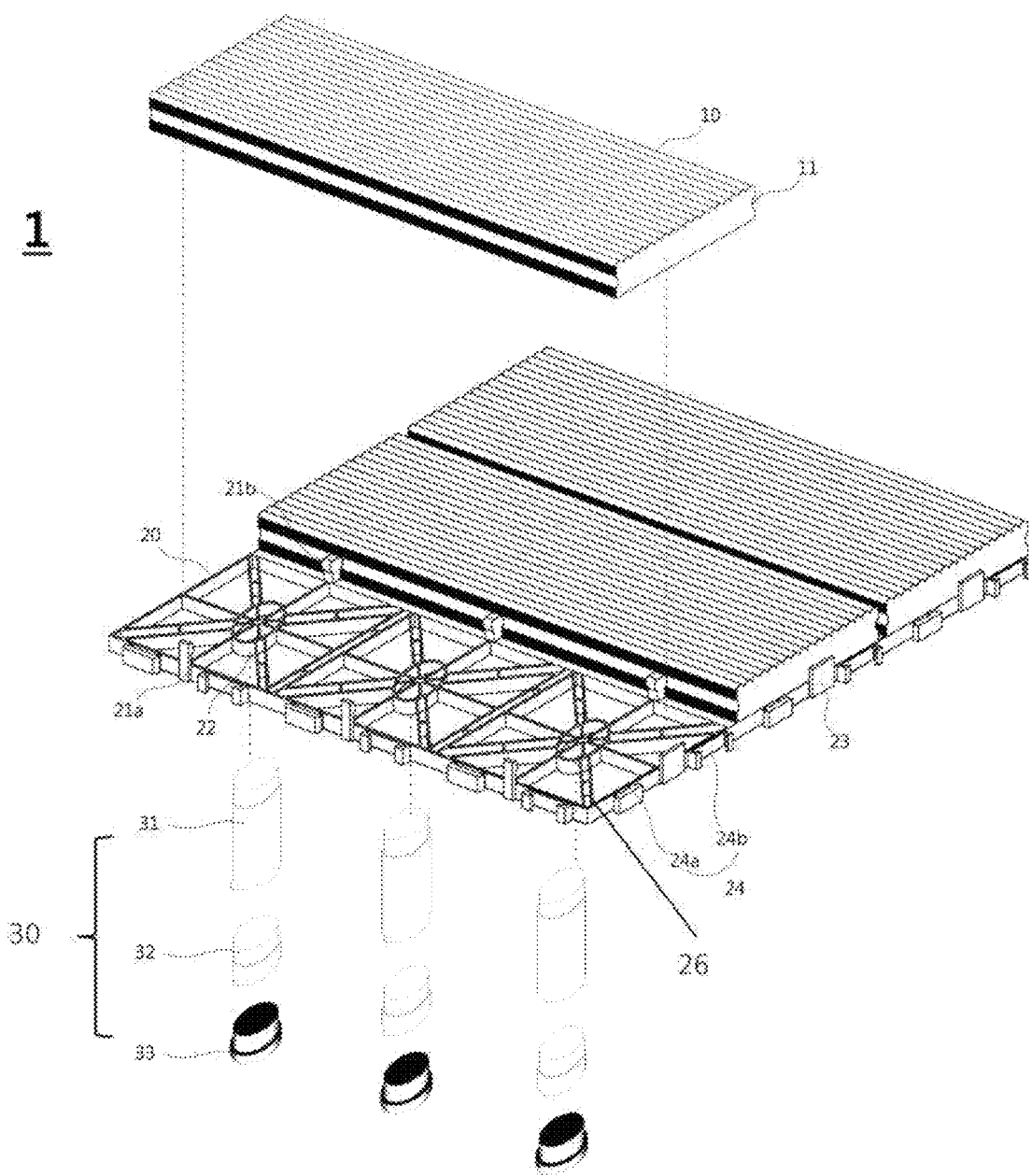
FIG. 1 is a view for illustrating a configuration of a wood block module according to the present invention.

Hereinafter, a wood block module according to the present invention, capable of level adjustment and shock absorption, will be described in detail with reference to the accompanying drawings.

Since the present invention may have diverse modifications and various embodiments, specific embodiments are illustrated in the drawings and described in detail. However, this does not limit the present invention within specific embodiments and it should be understood that the present invention covers all the modifications, equivalents, and replacements within the idea and technical scope of the present invention.

In describing the present invention, it will be understood that although the terms of first and second are used herein to describe various elements, these elements should not be limited by these terms. These terms are only used to distinguish one element from another element. For example, a first element may be referred to as a second element, and similarly, a second element may be referred to as a first element without departing from the scope of the present invention.

As used herein, the term "and/or" includes any and all combinations of one or more of the associated listed items.

It will also be understood that when an element is referred to as being "connected to" or "coupled to" another element, it can be directly connected to or directly coupled to another element, or intervening elements may also be present therebetween. In contrast, it will be understood that when an element is referred to as being "directly connected to" or "directly coupled to" another element, there is no intervening elements.

In the present application, the terms are used only for explaining a specific embodiment and are not intended to limit the present invention. The singular form may, unless definitely indicating a particular case in terms of the context, include a plural form.

In the present application, the term "include" or "comprise" is intended to specify the presence of stated features, numerals, steps, operations, elements, components, or combinations thereof, but does not preclude the presence or addition of one or more other features, numerals, steps, operations, elements, components, or combinations thereof.

Unless otherwise defined, all terms used herein including technical or scientific terms have the same meanings as those generally understood by a person with ordinary skill in the art to which the present invention pertains. Terms as defined in a commonly used dictionary should be construed as having the same meaning as in an associated technical context, and unless defined apparently in the description, should not be understood abnormally or as having an excessively formal meaning.

Also, the following embodiments are provided to fully describe the present invention to a person having ordinary knowledge in the art, and the shapes and sizes of elements in the drawings may be exaggerated for more clear explanation.

Hereinafter, in describing the present invention, detailed descriptions related to well-known functions or configurations will be ruled out in order not to unnecessarily obscure subject matters of the present invention.

Figure 2:
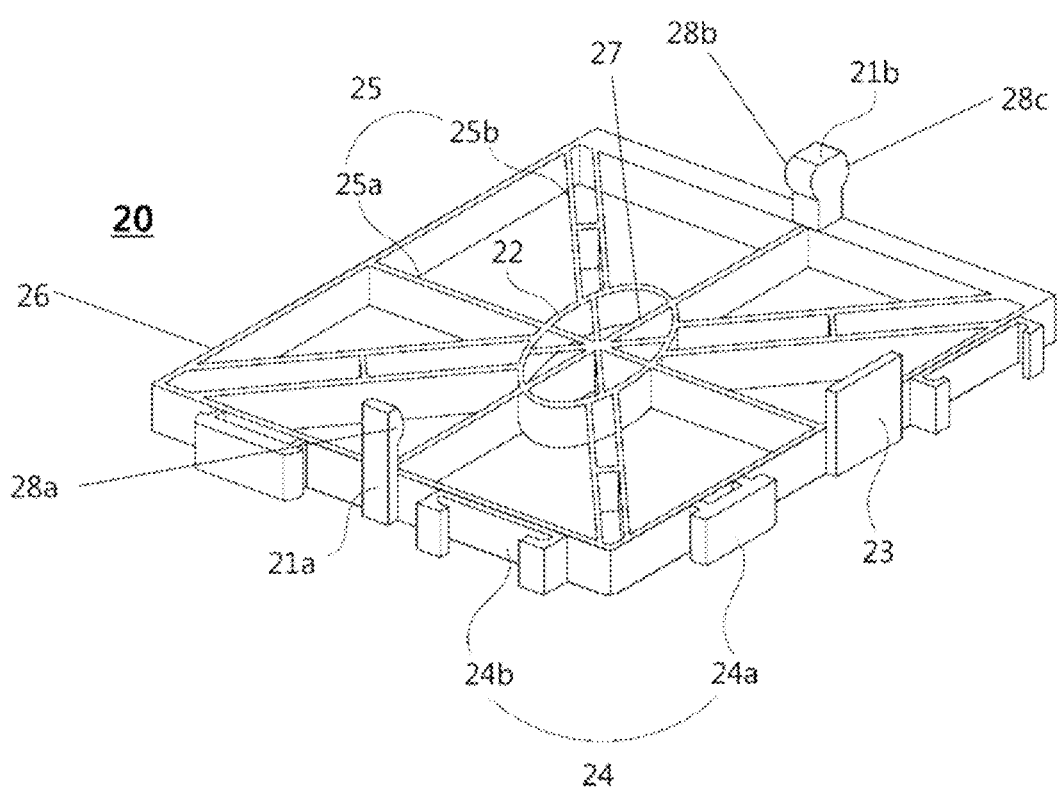
FIGS. 2 to 4 are views for illustrating a deck base of a wood block module in detail.
Figure 3:
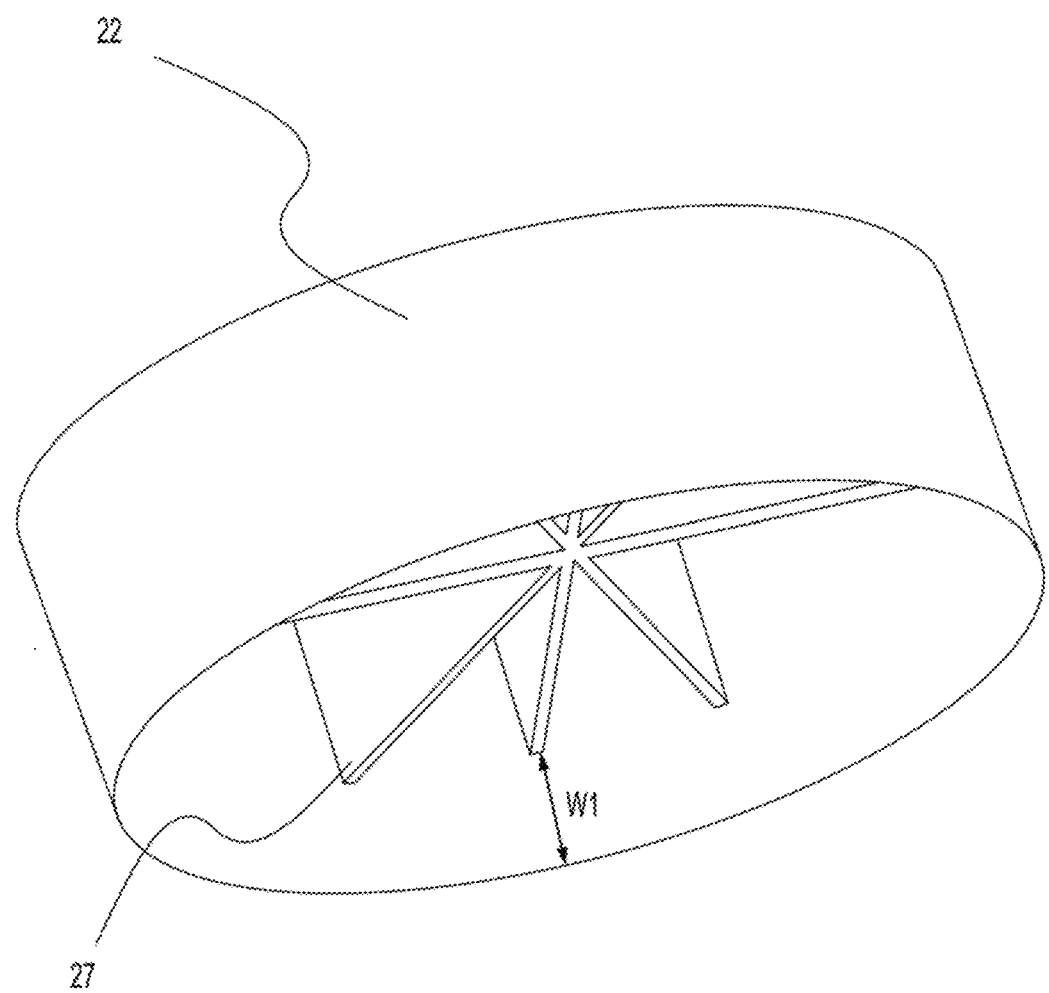
Figure 4:
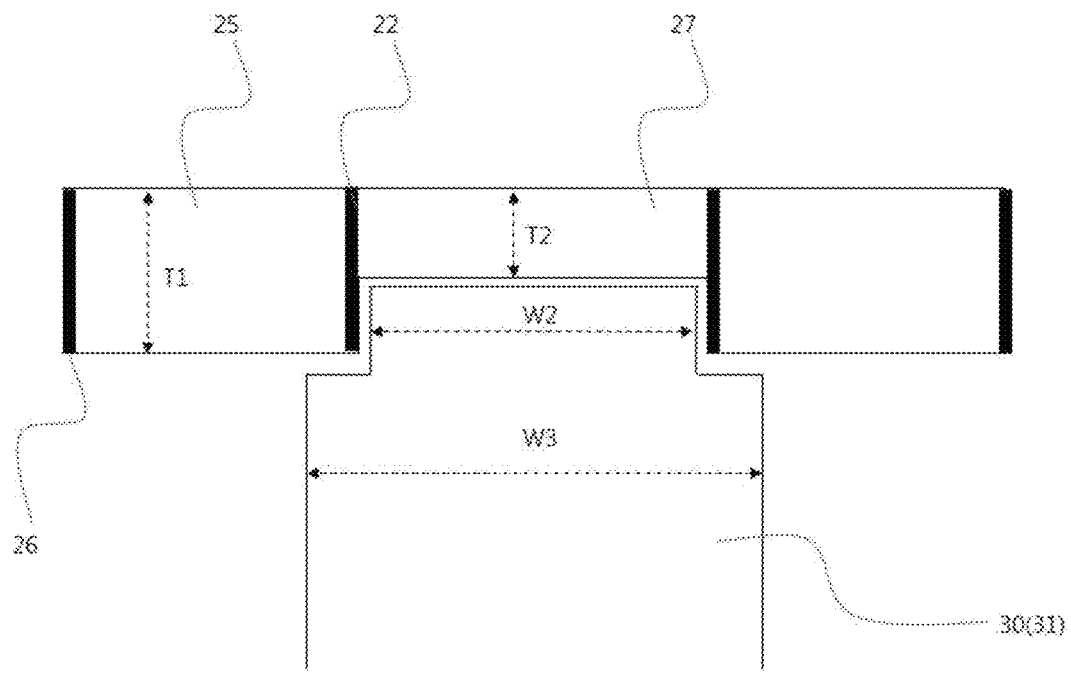

FIG. 1 is a view for illustrating a configuration of a wood block module according to the present invention, and FIGS. 2 to 4 are views for illustrating a deck base of a wood block module in detail.

Referring to FIG. 1, a deck module 1 (a wood block module) according to the present invention may include a deck block 10 (a wood block) and a deck base 20.

The deck block 10 may have a rectangular plate shape, and a groove 11 (a deck groove) may be formed on each of both side surfaces of the deck block 10 in a longitudinal direction.

Also, to prevent slip when walking, a plurality of protrusions (having an embossing shape) may be formed on the deck block 10.

Such a deck block 10 may be referred to as a 'deck material'.

The deck block 10 may be manufactured from a wood material, a resin material, or/and a metal material. For example, in a case where the deck block 10 is manufactured from a wood material, the deck block 10 may be referred to as a 'wood block'.

The deck base 20 is disposed below a wood block 10, and the wood block 10 may be placed thereon. In detail, the deck groove 11 of the wood block 10 may be coupled to a portion of the deck base 20.

The deck base 20 will be explained below in detail.

A wood block module 1 according to the present invention may further include a pillar 30 (a level adjusting pillar) disposed below the deck base 20.

To facilitate height adjustment, a level adjusting pillar 30 may include a first pillar 31, a second pillar 32, and a vibration-proof rubber 33 for a wood block leg. Here, a height of the first pillar 31 may be different from a height of the second pillar 32.

The first pillar 31, the second pillar 32, and the vibration-proof rubber 33 may be connected to each other in this order.

In controlling the height, at least one of the first pillar 31, the second pillar 32, or the vibration-proof rubber 33 may be omitted. For example, the first pillar 31, the second pillar 32, and the vibration-proof rubber 33 may be connected to each other in this order and used as the pillar 30, the first pillar 31 and the vibration-proof rubber 33 may be connected to each other and used as the pillar 30, the second pillar 32 and the vibration-proof rubber 33 may be connected to each other used as the pillar 30, or only the vibration-proof rubber 33 may be used as the pillar 30. Alternatively, the pillar 30 may not be used in some cases.

As described above, when the pillar 30 is disposed below the deck base 20, the height adjustment is possible, enabling easy and convenient installation irrespective of a place. Also, through finishing work to attach the vibration-proof rubber 33 for a wood block leg, serving as a vibration damping rubber, to a distal lower end portion, noise occurring when walking may be absorbed, and feeling of walking may be improved. Here, it is desirable that a height level value of the deck base 20 may be adjusted to 5 mm to 10 mm, and it is desirable to be adjusted up to 100 mm.

The deck base 20 will be described in more detail with reference to the accompanying drawing of FIG. 2.

Referring to FIG. 2, the deck base 20 may include a frame 26 having a rectangular frame shape, a core 22, connection bridges 25, 25a, and 25b, extended parts 21, 21a, and 21b, and protruded parts 28, 28a, 28b, and 28c.

The frame 26, the core 22, the connection bridges 25, 25a, and 25b, the extended parts 21, 21a, and 21b, and the protruded parts 28, 28a, 28b, and 28c may be integrated with each other.

Also, a material of the deck base 20 is not limited, and for example, the deck base 20 may be manufactured from a wood material, a metal material, a resin material, or the like. Preferably, the deck base 20 may be manufactured from a resin material. In this case, material costs of the deck base 20 may be reduced, a time required for manufacture may also be reduced, making it possible to reduce a manufacturing cost while ensuring structural stability.

The core 22 may be positioned at a center of the frame 26, having various shapes. When taking into consideration the connectivity with the level adjusting pillar 30 and the structural stability which will be described later, the cross-section of the core 22 may have at least one of a circular shape, an elliptical shape, or a polygonal shape such as a diamond, a rhombus, or a quadrangle. Preferably, it is desirable that the cross-section of the core 22 may have a circular or elliptical shape. In a case where the cross-section of the core 22 has the circular or elliptical shape, the core 22 may have a cylindrical shape.

The connection bridges 25, 25a, and 25b may extend radially from a core 220 and connect the core 22 and the frame 26.

Such connection bridges 25, 25a, and 25b may improve the structural stability of the deck base 20.

The connection bridges 25, 25a, and 25b may be divided into a first connection bridge 25a and a second connection bridge 25b on the basis of a shape. Hereinafter, for convenience of description, the first connection bridge 25a and the second connection bridge 25b are not distinguished from each other and will be collectively referred to as a connection bridge 25.

The extended parts 21, 21a, and 21b may extend from outer surfaces of the frame 26 in a direction orthogonal to the connection bridge 25. For example, in a case where the connection bridge 25 extends in a horizontal direction, the extended parts 21, 21a, and 21b may extend in a vertical direction.

In other words, the extended parts 21, 21a, and 21b in a direction of a front surface of the wood block module 1 or in a direction facing the wood block 10.

The protruded parts 28, 28a, 28b, and 28c may extend from ends of the extended parts 21, 21a, and 21b in a direction parallel to the connection bridge 25. For example, the protruded part 28 and the connection bridge 25 may extend in the horizontal direction.

The shape of the protruded part 28 may be diversely modified. For example, the cross-section of the protruded part 28 may have at least one of a circular shape, an elliptical shape, or a polygonal shape such as a diamond, a rhombus, a trapezoid, or a quadrangle.

In a case where the cross-section of the protruded part 28 has the circular or elliptical shape, the overall shape of the protruded part 28 may have a spherical or hemispherical shape.

The protruded parts 28, 28a, 28b, and 28c may correspond to the deck grooves 11 of the wood block 10. For example, a first protruded part 28a of a first extended part 21a and a second protruded part 28b of a second extended part 21b may be inserted into the respective deck grooves 11 on both sides of one wood block 10. Accordingly, the wood block 10 may be placed on the deck base 20.

FIG. 2 illustrates only a single deck base 20, but in the wood block module 1 according to the present invention, a plurality of deck bases 20 may be integrally manufactured with each other in a pattern of n×m (where, n and m are integers of 1 or more). FIG. 1 illustrates a case where nine deck bases 20 are integrally manufactured in a pattern of 3×3.

Hereinafter, the plurality of deck bases 20 integrally manufactured may be referred to as a mother deck base. Also, each of the deck bases included in the mother deck base may be referred to as a unit deck base.

The first extended part 21a and the first protruded part 28a may be disposed in the outermost unit deck base of the mother deck base. In other words, the first extended part 21a and the first protruded part 28a may be formed on an outer edge of the mother deck base.

In this case, the first extended part 21a and the first protruded part 28a may correspond to one wood block 10.

In another view point, it may be understood that one directional protrusion facing the core 22, that is the first protruded part 28a, is formed in the first extended part 21a.

A second extended part 21b, a second protruded part 28b, and a third protruded part 28c may be disposed between the unit deck bases included in the mother deck base. In other words, the second extended part 21b, the second protruded part 28b, and the third protruded part 28c may be formed inside the mother deck base.

In another view point, it may be understood that two directional protrusions protruding in a direction toward the core 22 and in a direction away from the core 22, that is, the second protruded part 28b and the third protruded part 28c are formed in the second extended part 21b.

In this case, the second extended part 21b may correspond to the two wood blocks 10. This will be apparent from FIGS. 5 to 6 below.

The deck base 20 may further include a connection part 24, which includes a positive connection part 24a and a negative connection part 24b, and a side finishing end 23.

Each of the positive connection part 24a and the negative connection part 24b may extend from the outer surface of the frame 26 in the direction parallel to the connection bridge 25.

The positive connection part 24a may correspond to a negative connection part 24b of another neighboring deck base 20, and the negative connection part 24b may correspond to a positive connection part 24a of another neighboring deck base 20. In other words, the positive connection part 24a may be coupled to the negative connection part 24b of another neighboring deck base 20, and the negative connection part 24b may be coupled to the positive connection part 24a of another neighboring deck base 20. Accordingly, the separate deck bases 20 may be connected to each other.

In the mother deck base, a positive connection part 24a and/or a negative connection part 24b may be formed on an outer edge of the outermost unit deck base of the plurality of unit deck bases included in the mother deck base.

The side finishing end 23 may extend from the outer surface of the frame 26 in a direction orthogonal to the connection bridge 25.

The side finishing end 23 may prevent the wood block 10 placed on the deck base 20 from falling out.

For the mother deck base, the side finishing end 23 may be formed on an outer edge of the outermost unit deck base of the plurality of unit deck bases included in the mother deck base.

Inner bridges 27 radially disposed may be formed inside the core 22. Each of the inner bridges 27 may improve the structural stability of the deck base 20.

Referring to FIGS. 3 to 4, in a lower portion of the deck base 20, the inner bridge 27 may be mounted by being inserted to a predetermined depth W1 from an end of the core 22.

In this case, an end of one side of the level adjusting pillar 30 is inserted into the core 22, and accordingly, the structural stability may be improved.

As a portion of the level adjusting pillar 30 is inserted into the core 22, a height T2 of the inner bridge 27 may be less than a height T1 of the connection bridge 25 and/or a height of the core 22.

In order for the portion of the level adjusting pillar 30 to be inserted into the core 22, a width W2 of the end of the level adjusting pillar 30 may be less than a width W3 of other portions adjacent to the end.

Accordingly, a peripheral portion of the end of the level adjusting pillar 30 may be stuck in a wall of the core 22, thereby preventing the level adjusting pillar 30 from being inserted excessively into the core 22.

Figure 5:
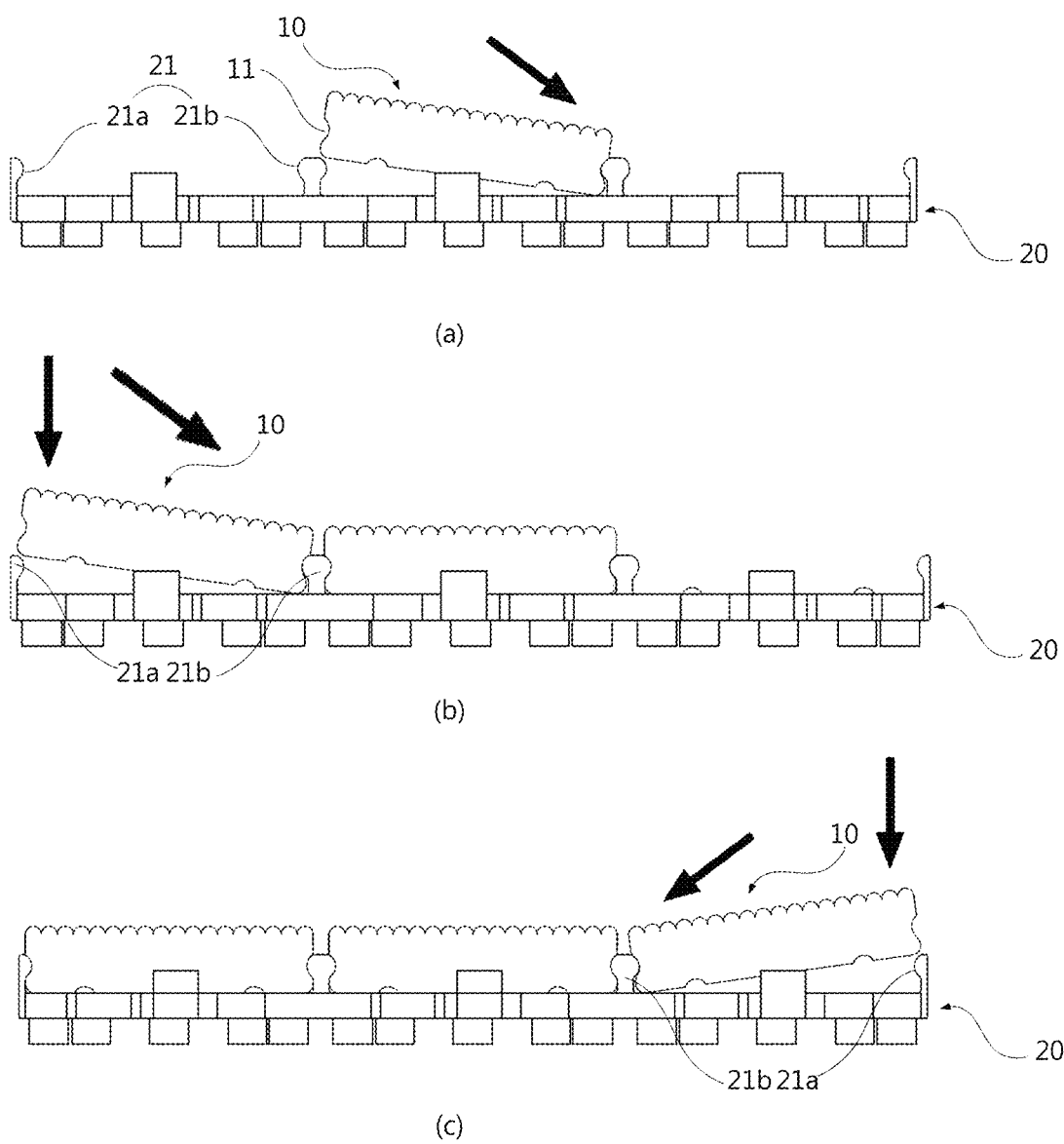
FIGS. 5 to 6 are views for illustrating a method for constructing a wood block module according to the present invention.
Figure 6:
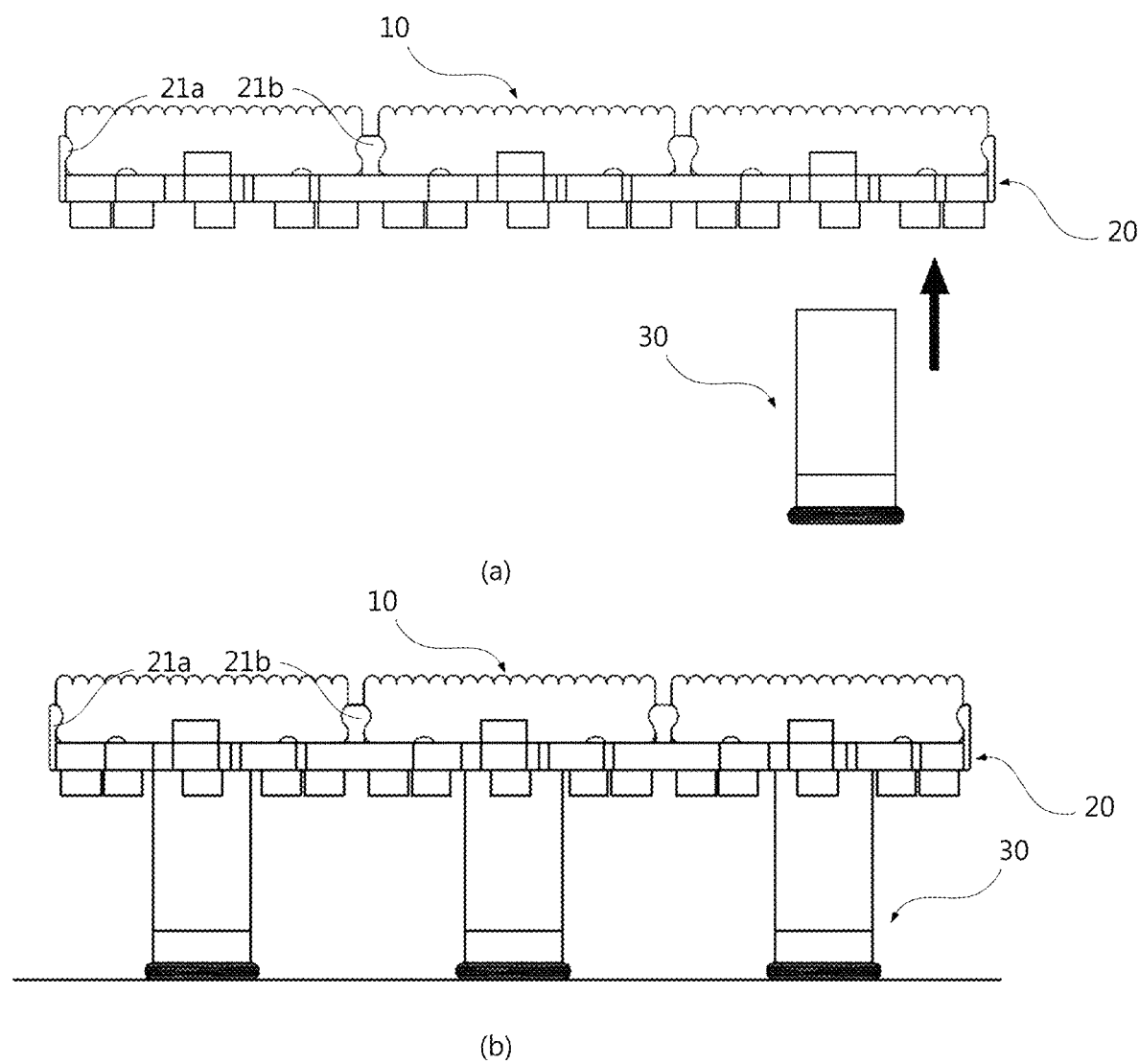

FIGS. 5 to 6 are views for illustrating a method for constructing a wood block module according to the present invention. Hereinafter, the features described above may be omitted.

Referring to FIG. 5, as in (a), one of deck grooves formed on both side surfaces of a wood block 10 in a longitudinal direction corresponds to and is inserted obliquely at a predetermined angle to one of two extended parts 21, 21a, and 21b of a unit deck base which is positioned at a center of a mother deck base including n or more deck bases 20 (where, n is an odd number of 3 or more).

Then, as in (b), a wood block 10 may be inserted into a unit deck base which is positioned on an edge of the mother deck base in a manner similar to (a).

Subsequently, as in (c), a wood block 10 may be inserted into the remaining unit deck base of the mother deck base in a manner similar to (a) and (b). However, a force in the opposite direction to (b) may be applied. The directions in which forces are applied may be confirmed by arrows illustrated in FIG. 5. Also, the sequence in which the forces are applied may be intuitively confirmed by (a), (b), and (c) of FIG. 5.

Subsequently, referring to (a) and (b) of FIG. 6, when coupling between all the deck bases 20 and the wood blocks 10 is completed, a level adjustment pillar 30, in which a first pillar 31, a second pillar 32, and/or a vibration-proof rubber 33 are combined below the deck bases 20 according to site conditions, may be fastened to each of cores 22 of the deck bases 20.

A vibration-proof rubber 33 for a wood block leg, which is disposed at a distal end of the level adjustment pillar 30, may absorb shock when walking and improve feeling of walking.

Also, to further improve shock absorption performance in the present invention, a cushioning part may be disposed above the deck base 20. Hereinafter, its description will be made with reference to the accompanying drawings.

FIGS. 7 to 14 are views for illustrating other configurations in addition to a configuration of a wood block module according to the present invention. Hereinafter, the features described above may be omitted. In the following drawings, the reference symbols used above may be omitted.

Figure 7:
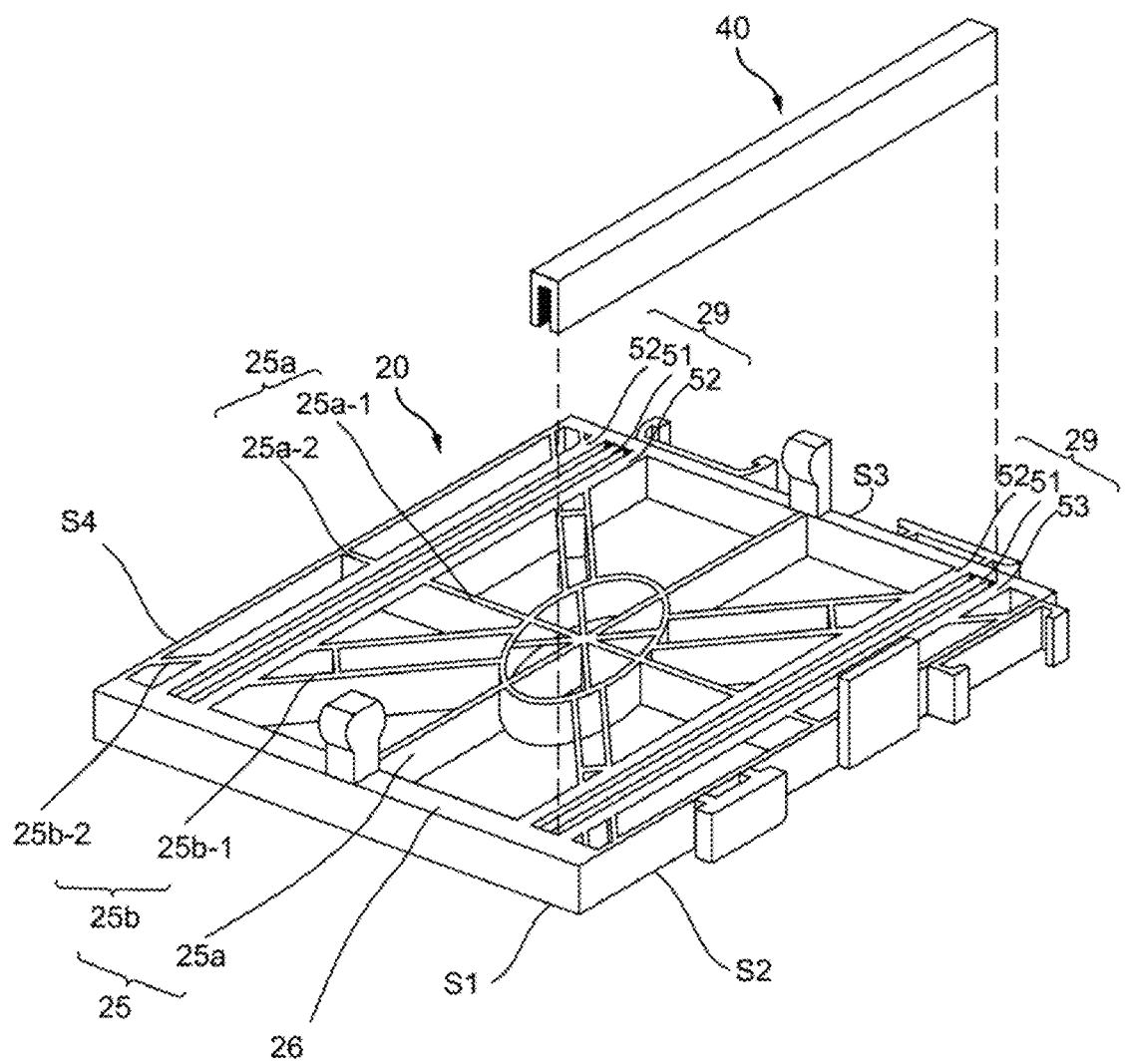
FIGS. 7 to 15 are views for illustrating other configurations in addition to a configuration of a wood block module according to the present invention.

Referring to FIG. 7, a wood block module according to the present invention may further include cushioning parts 40 disposed above a deck base 20.

Each of the cushioning parts 40 may include a soft material to effectively absorb/block shock and/or noise. For example, the cushioning part 40 may be manufactured from a rubber material, a resin material, a silicon material, a plastic material, or the like. Taking into considerations the manufacturing costs, noise absorbing/blocking performance, moldability, and the like, it is desirable that the cushioning part 40 includes the rubber material.

A seat part 29 may be formed on the deck base 20 to place the cushioning part 40 thereon.

To be placed on the seat part 29, the cushioning part 40 may include at least one cushioning legs 41 and 42.

Each of the cushioning legs 41 and 42 may protrude toward the deck base 20.

The cushioning part 40 may be disposed on the seat part 29 in a direction crossing the wood block 10 (for example, the direction orthogonal thereto).

To this end, the seat part 29 may also be formed on the deck base 20 in the direction crossing the wood block 10. For example, the seat part 29 may connect the two facing sides of a frame 26 in the direction crossing the wood block 10.

For example, as in FIG. 7, it may be assumed that the frame 26 includes a first side S1, a second side S2 adjacent to the first side S1, a third side S3 adjacent to the second side S2 and facing the first side S1, and a fourth side S4 adjacent to the first side S1 and the third side S3 and facing the second side S2.

In this case, the seat part 29 may extend from the first side S1 to the third side S3 of the frame 26.

In this document, two seat parts 29 are illustrated as being disposed on one deck base 20. However, the number of seat parts 29 formed on the one deck base 20 may be diversely modified. For example, one seat part 29 may be formed on one deck base 29.

The seat part 29 may include a first wall 51, a second wall 52, a third wall 53, which are parallel to each other.

The first wall 51 and the second wall 52 may be spaced a predetermined distance from each other in the direction crossing the wood block 10, and the second wall 52 and the third wall 53 may also be spaced a predetermined distance from each other in the direction crossing the wood block 10. Accordingly, the first wall 51, the second wall 52, and the third wall 53 may form a certain rail.

The cushioning part 40 may be placed on and fixed to the rail formed by the first, second, and third walls 51, 52, and 53.

The seat part 29 may cross at least one connection bridge 25. Accordingly, the connection bridge 25 crossed by the seat part 29 may be divided into two parts.

For example, the at least one connection bridge 25 may be divided into inner connection bridges 25a-1 and 25b-1 and outer connection bridges 25a-2 and 25b-2 by the seat part 29.

In this case, the outer connection bridges 25a-2 and 25b-2 may be shorter than the inner connection bridges 25a-1 and 25b-1, respectively.

The present document describes a case in which the seat part 29 includes the three walls 51, 52, and 53, and accordingly, the cushioning part 40 includes the two cushioning legs 41 and 42. However, the present invention is not limited thereto. For example, the seat part 29 may include two walls, and accordingly, the cushioning part 40 may include one cushioning leg.

Figure 8:
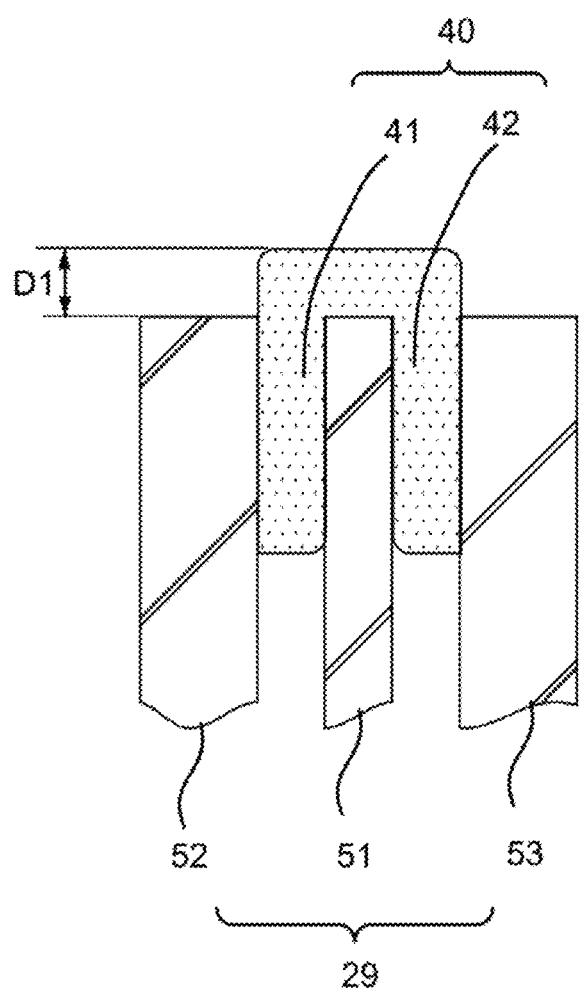

As in FIG. 8, a cushioning part 40 may be placed on a seat part 29. For example, a first cushioning leg 41 of the cushioning part 40 is inserted into a space between a first wall 51 and a second wall 52 of the seat part 29, and a second cushioning leg 42 is inserted into a space between the first wall 51 and a third wall 53 of the seat part 29. Thus, the cushioning part 40 may be supported by the seat part 29.

In a state in which the cushioning part 40 is placed on the seat part 29, the cushioning part 40 may protrude a predetermined height D1 from the seat part 29 toward a wood block 10.

In this case, the wood block 10 may come into close contact with the cushioning part 40.

Figure 9:
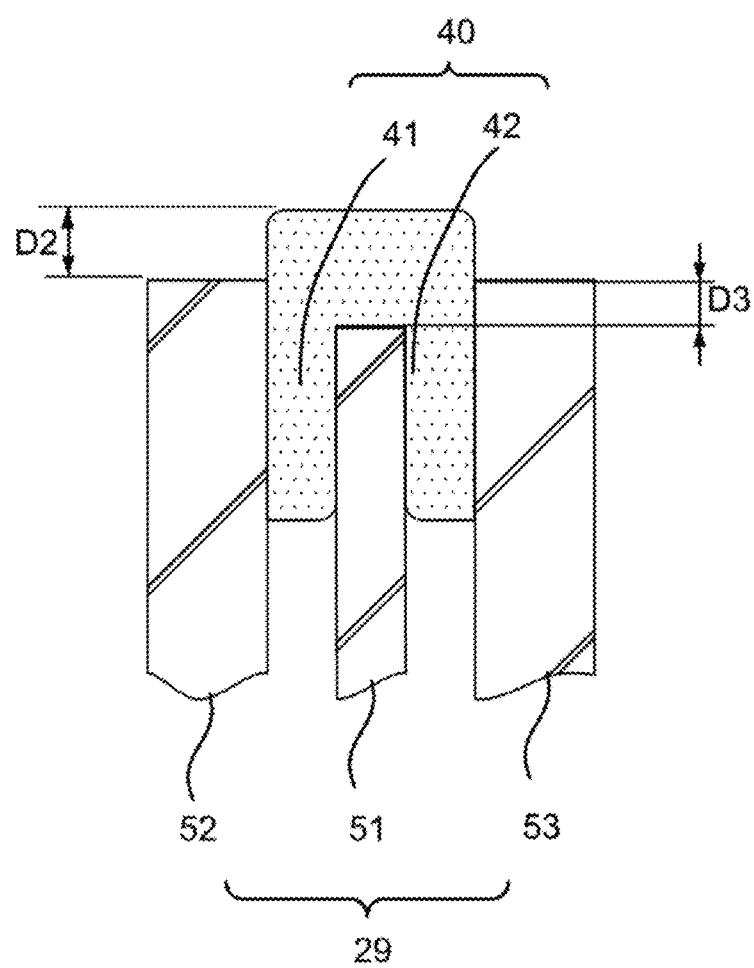

Referring to FIG. 9, a height of a first wall 51 of a seat part 29 may be less than a height of a second wall 52 and/or a third wall 53 by D3.

In this case, a coupling force between a cushioning part 40 and the seat part 29 may be enhanced.

Even in the structure described above, the cushioning part 40 may protrude a predetermined height D2 from the seat part 29 toward a wood block 10 in a state in which the cushioning part 40 is placed on the seat part 29.

Figure 10:
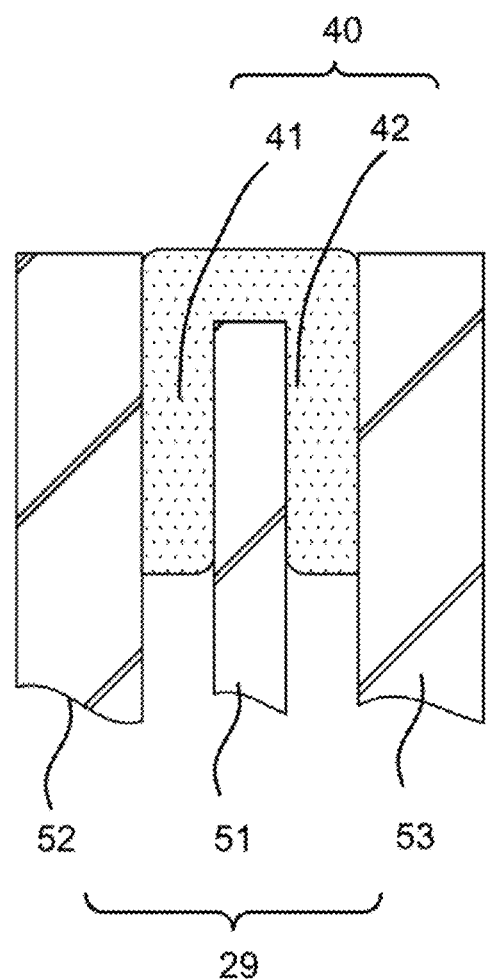

Alternatively, as in FIG. 10, a height of a first wall 51 of a seat part 29 may be less than a height of a second wall 52 and/or a third wall 53, and a cushioning part and the seat part 29 may have substantially the same height in a state in which the cushioning part 40 is placed on the seat part 29.

Figure 11:
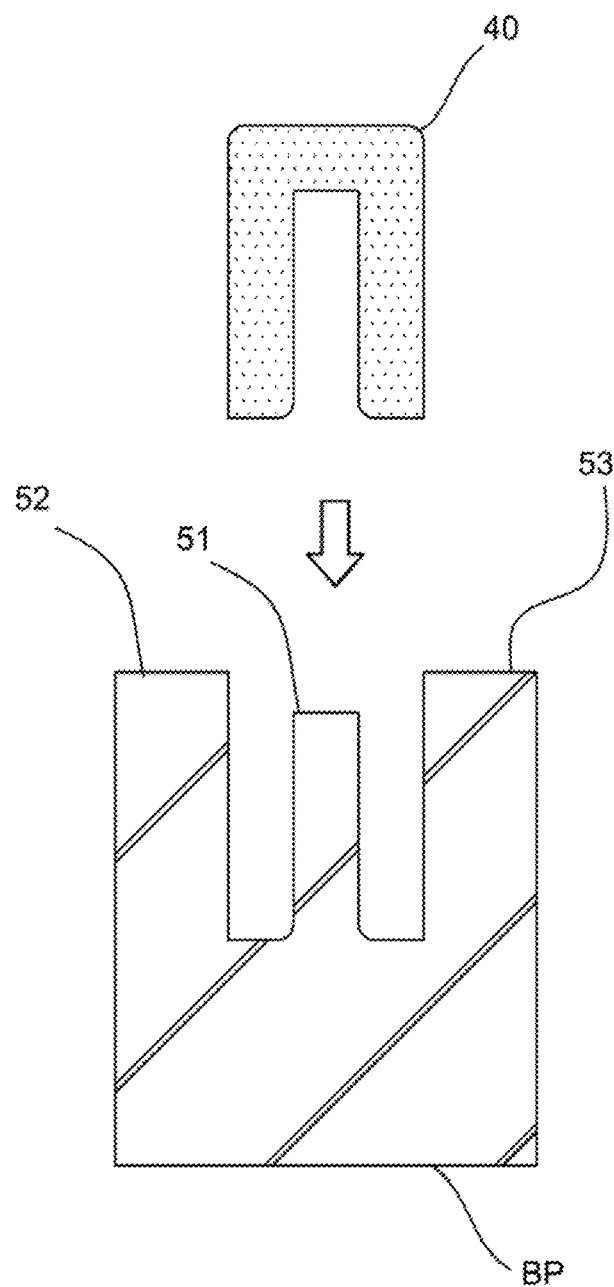

Referring to FIG. 11, a first wall 51, a second wall 52, and a third wall 53 of a cushioning part 29 may be connected to each other in a lower portion.

In this case, a lower portion of a space between the first wall 51 and the second wall 52 and a lower portion of a space between the first wall 51 and the third wall 53 may be closed.

A reference symbol BP in FIG. 11, which is not described, may be referred to as a lower surface of the cushioning part 29.

Figure 12:
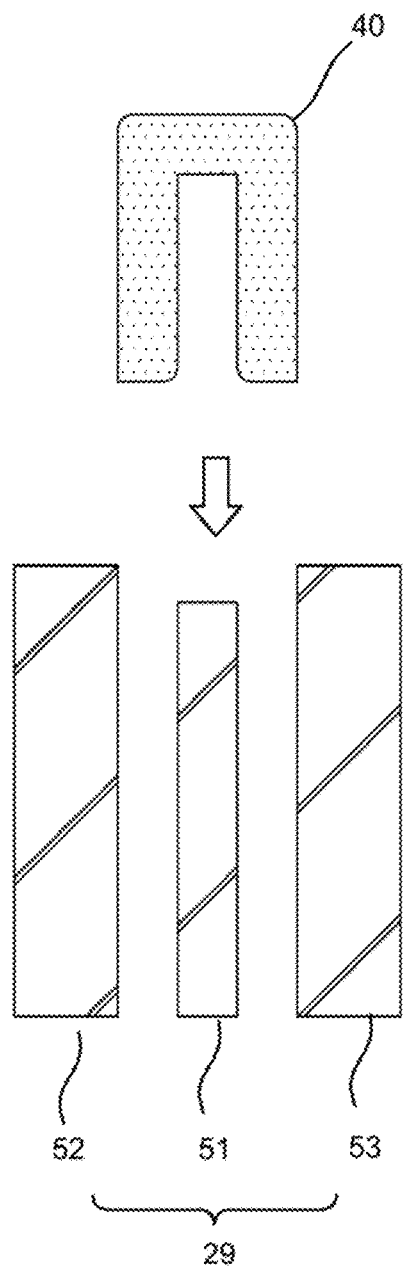

Alternatively, as in FIG. 12, a lower portion of a space between a first wall 51 and a second wall 52 and a lower portion of a space between the first wall 51 and a third wall 53 may be open.

In this case, lengths of cushioning legs 41 and 42 of a cushioning part 40 may be freely adjusted.

Figure 13:
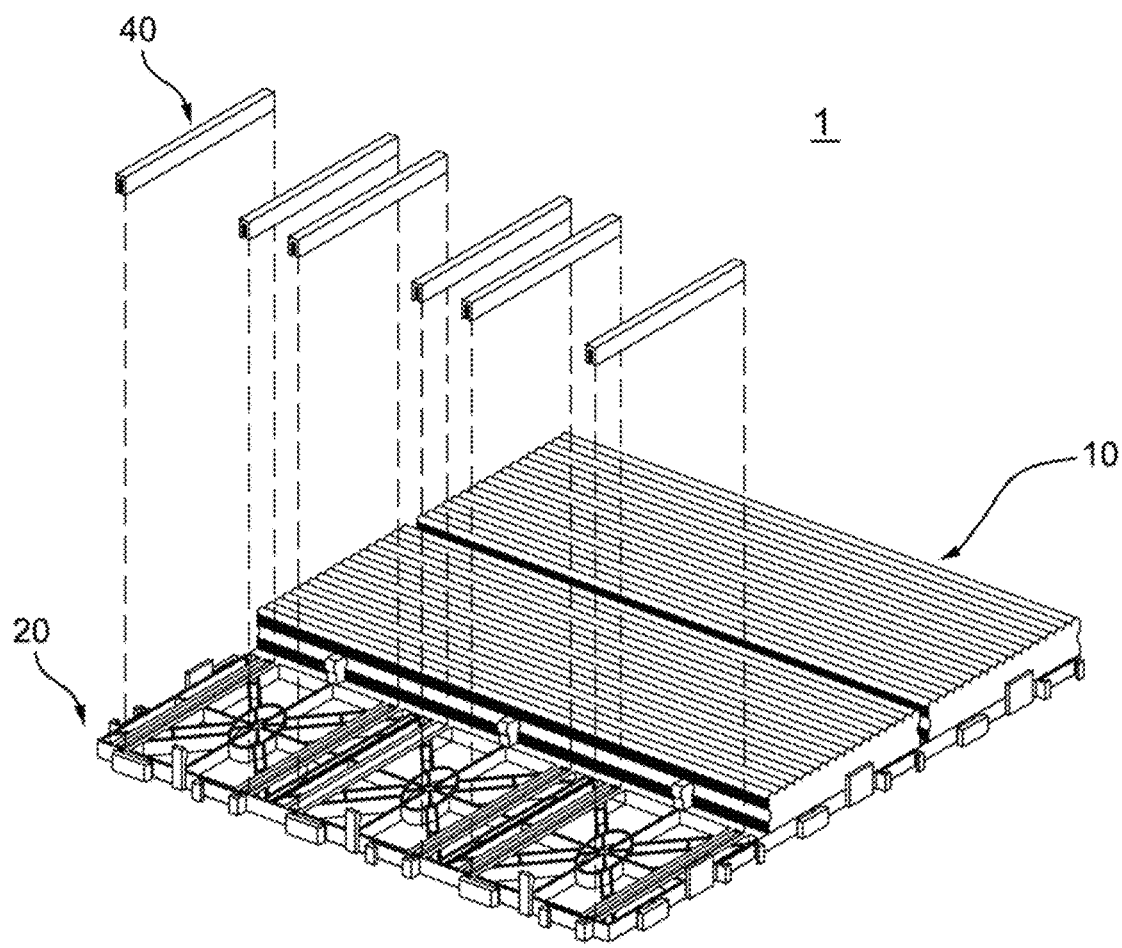

Referring to FIG. 13, in a state in which cushioning parts 40 are placed on respective seat parts 29, wood blocks 10 may be disposed above deck bases 20. Accordingly, when a pedestrian steps on the wood blocks 10 while walking, shock caused thereby may be absorbed/blocked/attenuated by the cushioning parts 40. Accordingly, the occurrence of noise may be reduced.

Furthermore, the wood blocks 10 may come into close contact by the cushioning parts 40.

The cushioning parts 40 are covered by the wood blocks 10 and thus may not be observed from above a wood block module 1.

A method for arranging the wood blocks 10 has been described in detail above, and thus, the further description thereof will be omitted.

Figure 14:
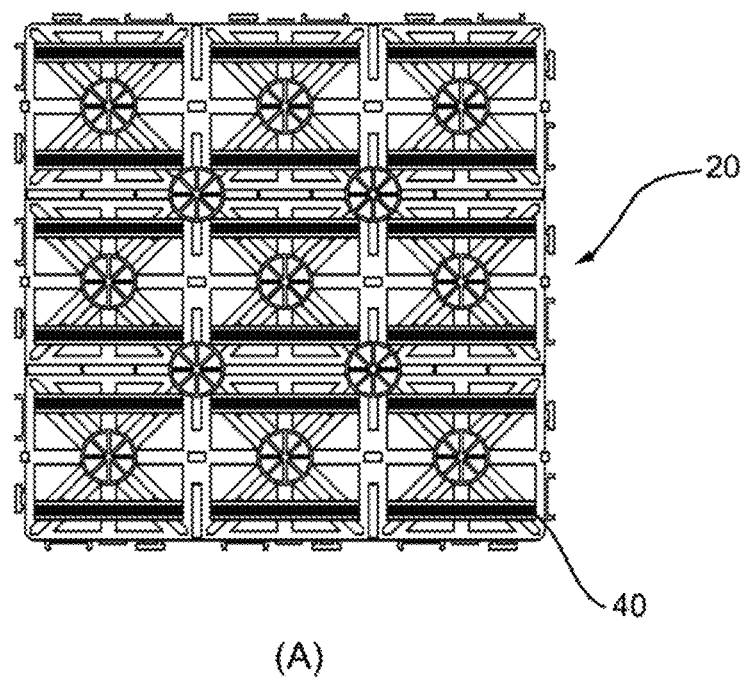
Figure 14:
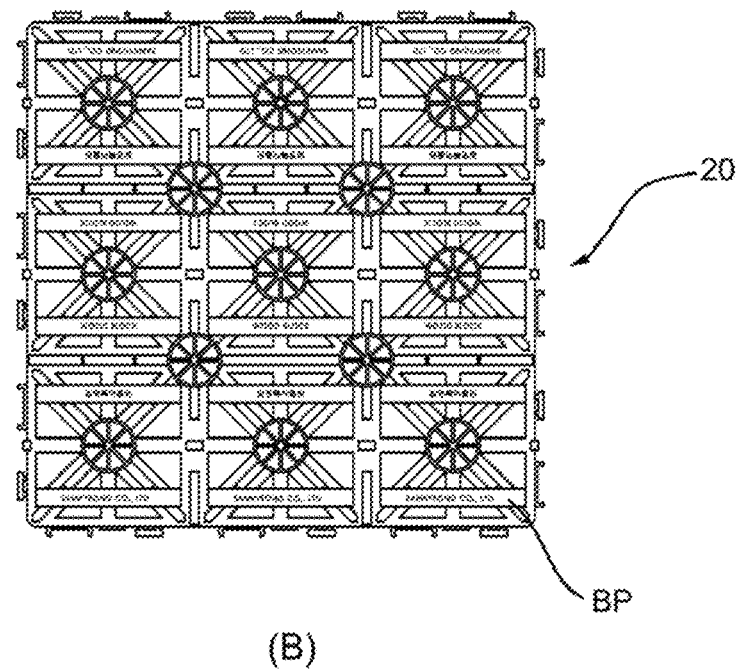

In (A) of FIG. 14, an example of a mother deck base, which includes nine unit deck bases in a pattern of 3×3, is illustrated.

As illustrated in (A), it may be confirmed that two cushioning parts 40 are disposed on each of the unit deck bases.

(A) shows a state in which the mother deck base is observed in a front direction.

(B) of FIG. 14 shows a state in which the mother deck base is observed in a rear direction.

Predetermined notes, comments, and logos may be marked on a lower surface BP of each of the cushioning parts 40 in (B).

Here, only a case where the inner bridges 27 are disposed inside the core 22 is described above, but on the contrary, the inner bridge 27 may be omitted in the present invention. An example of the above configuration is illustrated in FIG. 15.

Figure 15:
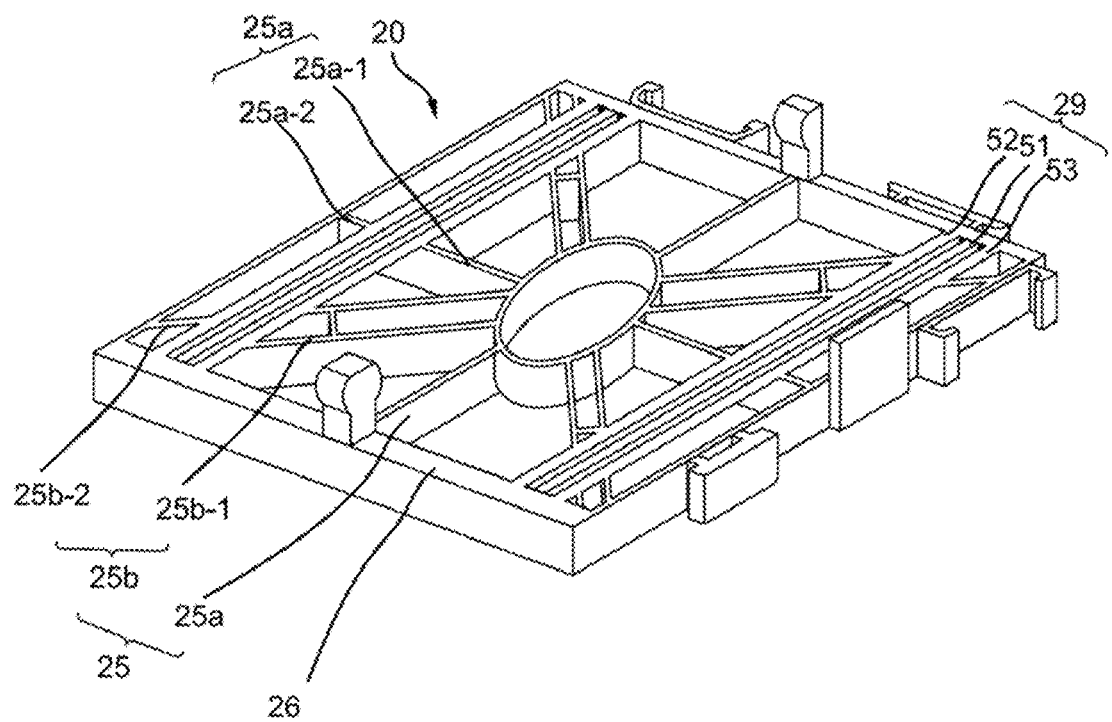

Features of FIG. 15 may be fully derived from the above, and thus, the further description thereof will be omitted.

As described in detail above, since the deck base 20 is used, the wood block module 1 according to the present invention may be independently constructed without separate fastening means such as nails and screws.

Also, in the wood block module 1 according to the present invention, water may be smoothly drained in any place, indoors and outdoors, by the combination of the deck base 20 and the level adjustment pillar 30.

In addition, in the wood block module 1 according to the present invention, the complex lower support is unnecessary. Thus, the construction and maintenance become remarkably simple, pattern construction is possible unlike in a general wood construction, and aesthetic appearance may be provided.

Furthermore, in the wood block module 1 according to the present invention, the noise occurring during walking may be suppressed, and the feeling of walking may be enhanced.

Moreover, in the wood block module 1 according to the present invention, the wood block 20 may come into more close contact by the cushioning part 40, and thus, a slip phenomenon occurring when wood is contracted may be compensated.

As described above, exemplary embodiments of the present invention have been disclosed in this specification and drawings. Although specific terms are used, these are used as general meanings for easily explaining the technical details of the present invention and for helping understanding of the invention, and are not used to limit the scope of the present invention. In addition to the embodiments set forth herein, it will be clear to those skilled in the art to which the present invention pertains that other modifications can be implemented based on the technical ideas of the present invention.

The invention claimed is:

1. A wood block module, which is level adjustable and shock absorbable, comprising:
   a wood block having a deck groove formed on each of both side surfaces in a longitudinal direction; and
   a deck base which is disposed below the wood block and on which the wood block is placed,
   wherein the deck base comprises:
   a frame having a quadrangular frame shape;
   a core positioned at a center of the frame;
   a connection bridge which extends radially from the core and connects the core and the frame;
   an extended part which extends from an outer surface of the frame in a direction orthogonal to the connection bridge; and
   a protruded part which protrudes from an end of the extended part in a direction parallel to the connection bridge and corresponds to the deck groove of the wood block,
   wherein the wood block module further comprises:
   a pillar part disposed below the deck base; and
   a vibration-proof rubber disposed at an end of one side of the pillar part, and at least a portion of an end of the other side of the pillar part is inserted into the core,
wherein the deck base further comprises:
a first side;
a second side adjacent to the first side;
a third side which is adjacent to the second side and faces the first side;
a fourth side which faces the second side and is adjacent to the first side and the third side; and
a first wall, a second wall, and a third wall, which extend from the first side to the third side in a direction parallel to the second side and the fourth side, and
the second wall is positioned between the first wall and the third wall,
wherein the wood block module further comprises a cushioning part disposed between the deck base and the wood block, and
the cushioning part comprises:
a first cushioning leg inserted into a space between the first wall and the second wall; and
a second cushioning leg inserted into a space between the second wall and the third wall.

2. The wood block module of claim 1, wherein the first, second, and third walls are disposed in each of a region between the core and the second side and a region between the core and the fourth side,
the cushioning part comprises a rubber material, and
the first, second, and third walls cross and divide the at least one connection bridge.

3. The wood block module of claim 1, wherein the pillar part comprises a first pillar and a second pillar,
one side of the first pillar is connected to the other side of the second pillar,
at least a portion of an end of the other side of the first pillar is inserted into the core,
the vibration-proof rubber is disposed at an end of the one side of the second pillar, and
a height of the first pillar is different from a height of the second pillar.

4. The wood block module of claim 1, wherein the first wall, the second wall, and the third wall are connected to each other in a lower portion of the deck base.

* * * * *